March 12, 1940.    F. W. MERRILL    2,193,675
DYNAMO-ELECTRIC MACHINE
Filed Aug. 28, 1937
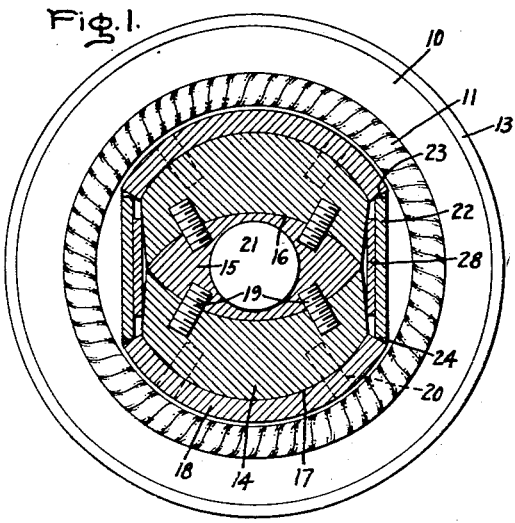
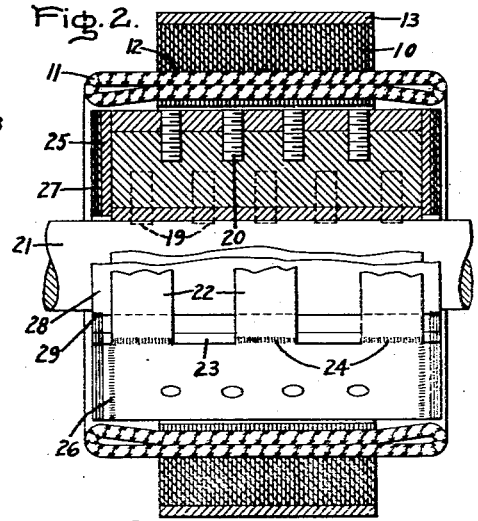
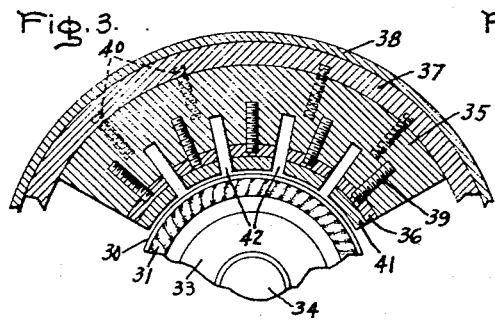
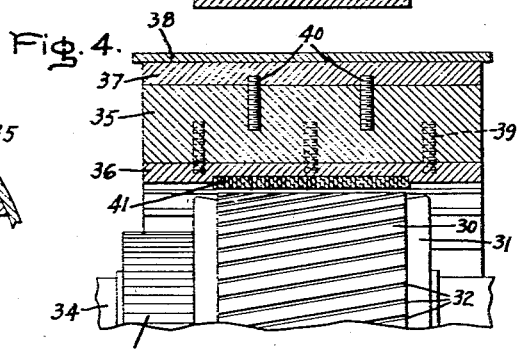
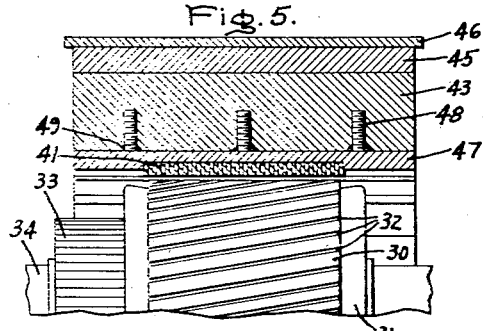
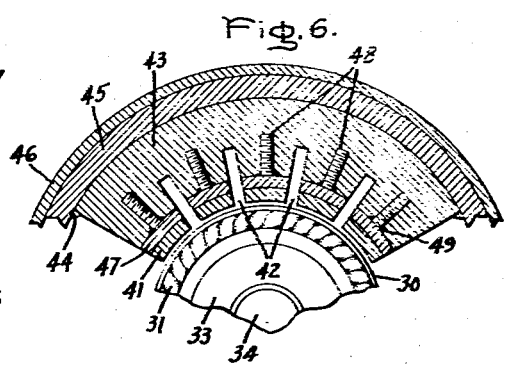
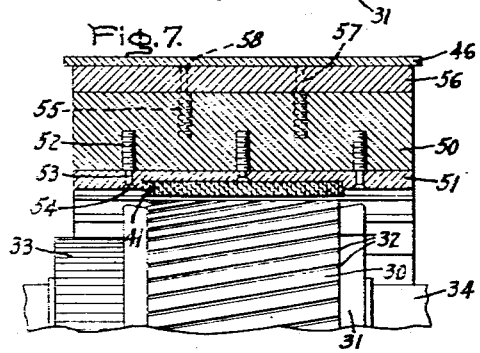
Inventor:
Frank W. Merrill,
by Harry E. Dunham
His Attorney.

Patented Mar. 12, 1940

2,193,675

UNITED STATES PATENT OFFICE 2,193,675

DYNAMO-ELECTRIC MACHINE

Frank W. Merrill, Fort Wayne, Ind., assignor to General Electric Company, a corporation of New York Application August 28, 1937, Serial No. 161,453

14 Claims. (Cl. 171—209)

My invention relates to improvements in dynamo-electric machines, and particularly to the type of machine having a permanent magnet excitation system.

Permanent magnets have heretofore been used for the excitation of small dynamo-electric machines, but the size of these machines generally has been relatively large compared to electrically excited machines of the same rating. Such magnets usually have been of the horse-shoe shape to obtain the length and shielding against demagnetization necessary for satisfactory performance. Recent improvements have been made in permanent magnet materials of high magnetic retentivity. Such permanent magnets may be formed of an iron-nickel-aluminum alloy as described in United States Patent 1,947,274, February 13, 1934, Ruder, or an iron-nickel-aluminum-cobalt alloy as described in United States Patent 1,968,569, July 13, 1934, Ruder, which retain their magnetism indefinitely. These new alloys generally are extremely brittle and hard, which makes it impractical to machine, or otherwise work mechanically, after the material has been cast. Furthermore, the reluctance of these magnets is relatively high, and it is desirable, therefore, that the reluctance of the total magnetic circuit be reduced to a minimum and that some provision should be made to minimize the demagnetizing effect of the cross flux set up by currents flowing through the electric windings on the machine.

An object of my invention is to provide a dynamo-electric machine with a permanent magnet excitation system of improved and strengthened construction, and an improved and simplified method of making the same.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end view of a dynamo-electric machine having a rotor partly in section and provided with an embodiment of my improved excitation system; Fig. 2 is a partial sectional side elevation of the machine illustrated in Fig. 1; Fig. 3 is a partial sectional end view of a dynamo-electric machine partly broken away and having a stationary member provided with an embodiment of my improved excitation system; Fig. 4 is a partial sectional side elevation of the machine illustrated in Fig. 3; Fig. 5 is a partial sectional side elevation of a dynamo-electric machine having a stationary member provided with another embodiment of my improved excitation system; Fig. 6 is a partial sectional end view of the machine shown in Fig. 5; and Fig. 7 is a partial sectional side elevation of a dynamo-electric machine provided with a further embodiment of my improved excitation system.

Referring to the drawing, in Figs. 1 and 2, I have illustrated a dynamo-electric machine including a stationary member provided with a laminated core 10 of magnetic material, and having a winding 11 arranged in slots 12 formed in the magnetic core 10 which is secured within a frame 13. The field excitation system of this dynamo-electric machine comprises a rotatable member which is arranged to cooperate electrodynamically with the stationary core 10 and the winding 11. This rotatable member includes two transversely arcuate thin bar-type permanent magnet pads or pole pieces 14 of substantially uniform thickness mounted upon a magnetic soft iron or soft steel supporting member or core 15 having a substantially elliptical transverse cross-section. The length of the major axis or transverse width of the elliptical supporting member 15 is substantially equal to the transverse width of the permanent magnet pole pieces 14, and the transversely arcuate sides 16 of the supporting member 15 are formed on a radius which is substantially equal to the radius of the outer arcuate sides 17 of the permanent magnet pole pieces. To provide a substantially uniform air gap, as shown in Fig. 1, the outer arcuate sides 17 of the permanent magnet pole pieces 14 are arranged to form sections of a single substantially cylindrical surface. With this construction, the magnetic path through the supporting member or core 15 is reduced to a minimum, thereby reducing the reluctance of the magnetic circuit and the magnetic lines of force tend to take a position parallel to the center line along the minor axis of the elliptical core 15. This has the effect of producing an increased length of the magnet in the directions of the lines of force, which gives a direct increase in the magnetomotive force available. Furthermore, since the soft magnetic material of the core 15 has a relatively low reluctance as compared to the reluctance of the permanent magnet pole pieces, the magnetic reluctance of the excitation system is substantially the same for all of the magnetic lines of force from one arcuate side 17 of one pole piece to the other arcuate side 17 of the other pole piece. These pole pieces are preferably formed of an alloy of aluminum, nickel, cobalt, and iron, such as that mentioned above, which alloy has an inherent property of forming an oxide over the surface thereof when in a molten state which substantially prevents fusing of this alloy with other members such as the supporting core, the pole faces, or the roughened surface inserts, when it is cast in contact with them. This oxide which inherently forms on this alloy is due largely to the aluminum content thereof. In a dynamo-electric machine provided with this type of permanent magnet pole piece, I have found it desirable to construct the pole pieces 14 of substantially greater axial length than the length of the stationary magnetic core 10, in order to obtain the desired flux density in the air gap. I provide magnetic soft iron or soft steel pole faces 18 which act as flux concentrators, and are carried on the outer surfaces 17 of the pole pieces 14. These pole faces provide a path of low magnetic reluctance for the flux produced by the portion of the pole pieces extending beyond the air gap between the pole pieces and the magnetic core 10, in completing the magnetic circuit through the stationary core 10, thereby minimizing flux leakage at the ends of the pole pieces 14. This feature of this construction is disclosed and claimed in my United States Patent No. 2,059,886, granted November 3, 1936, to the General Electric Company, assignee of my present invention.

In constructing this type of permanent magnet excitation system, I have found it difficult to machine the permanent magnet pole pieces 14 after they have been cast, due to the brittleness and hardness of the permanent magnet material. In order to overcome this difficulty, I provide a plurality of elements or projections 19 having roughened surfaces, such as threaded steel studs, which project outwardly from the elliptical core 15, and which may be secured in the core by casting the core about a portion of these studs, or these studs may be secured into holes drilled and tapped into the core. As is shown in Fig. 1, the studs 19 are arranged so that the center lines of these studs do not extend along a single line, but all extend in angularly different directions and are spaced apart about the periphery of the ellipse. As shown in dotted lines in Fig. 2, five sets of these elements or studs 19 are arranged in longitudinally spaced relation over the length of the supporting member or core 15. Each of the soft magnetic material pole faces 18 also is provided with two parallel sets of threaded steel studs or inserts 20 having roughened surfaces which extend inwardly from the pole faces, and are secured in the pole faces 18 by being screwed into drilled and tapped holes in the pole faces, or the pole faces may be cast about an end of each of the inserts. As shown in Fig. 1, the elements or studs 20 extend in angularly different directions into the pole pieces 14 from the direction of the studs or inserts 19, and as shown in Fig. 2, the studs 20 are arranged in axially spaced apart relation intermediate the studs 19. In making this excitation system, the supporting member 15 is formed with the circumferentially spaced apart studs 19 extending outwardly therefrom, and is mounted upon a shaft 21. The pole faces 18 are then arranged in concentric relation with respect to the supporting member 15 and in radially spaced apart relation thereto, with the roughened projections or studs 20 extending toward the supporting member 15. The permanent magnet pole pieces 14 then are cast between the supporting member 15 and the pole faces 18 and around the studs 19 and 20. When the molten permanent magnet material cools, it tends to shrink, and thereby secures the permanent magnet pole pieces 14 to the pole faces 18 and to the supporting member 15 by the clamping or compressive binding action of the permanent magnet material shrinking about the roughened or threaded surfaces of the projections 19 and 20. As can be seen from Figs. 1 and 2, the elements or projections 19 and 20 all are out of alignment, and are arranged in axially and circumferentially staggered relation, each extending at a different angle with respect to the next adjacent projection. This arrangement provides a construction having a maximum shearing strength, as none of the projections which form the securing elements between the permanent magnet pole piece and supporting member and the pole faces extends in the same shearing plane as the next adjacent projection. In order further to strengthen the assembly of these pole pieces, strips 22 of non-magnetic steel or similar material extend between adjacent longitudinally extending edges 23 of adjacent pole faces 18, and are secured thereto by welding, as shown at 24. An end plate 25 of non-magnetic material is also arranged at each end of the rotatable member, and is secured by welding at 26 to adjacent transverse ends of the pole faces 18 in order further to strengthen the assembly construction.

Under certain operating conditions, it has been found that a cross-magnetomotive force is set up by the current induced in the winding 11 of the stationary member, and that this cross-magnetomotive force produces a cross flux which tends to saturate the pole faces and the adjacent pole pieces thereby decreasing the effectiveness thereof. Furthermore, if this rotatable member construction is used to excite a single phase winding, it becomes necessary to provide an arrangement for damping out the double frequency magnetic flux set up by the current in the winding 11, which has a strong demagnetizing effect upon the permanent magnet pole pieces 14. In order to provide this damping, a set of plates 27 of low electrical resistance material, such as copper or brass, is arranged at each end of the rotatable member, and a bar 28 of low electrical resistance material is arranged between the sides of each pair of adjacent pole pieces 14 and between the sides of these pole pieces and the non-magnetic strips 22. The bars 28 and the plates 27 are secured together in good electrical contact at 29 by brazing, soldering, or some similar manner. This provides a short-circuit single turn winding of low electrical resistance which provides a very heavy damping circuit about the permanent magnet pole pieces 14. Any change in the flux of the permanent magnets will induce a current in the damping coil circuit which will produce a magnetomotive force tending to prevent the change in the flux of the permanent magnets and minimize the demagnetizing effect of extraneous fluxes upon the permanent magnet pole pieces. This construction is an improvement of the arrangement disclosed and claimed in my United States Patent No. 2,078,805, April 27, 1937, granted to the General Electric Company, assignee of my present invention.

In Figs. 3 and 4, I have illustrated a dynamo-electric machine including a rotatable member provided with a laminated core 30 having a winding 31 arranged in slots 32 in the core 30 and connected to commutator 33. This rotatable member is essentially a conventional direct-current armature, and is mounted on a shaft 34. The excitation system of the dynamo-electric machine comprises a stationary member arranged to cooperate electrodynamically with the rotatable member, and includes two transversely arcuate thin bar-type permanent magnet pads or pole pieces 35. As in the embodiment illustrated in Figs. 1 and 2, the pole pieces 35 preferably are formed of an alloy of aluminum, nickel, cobalt, and iron, and have a substantially greater axial length than the length of the rotatable core 30. These permanent magnet pole pieces 35 are provided with pole faces 36 of soft magnetic material, and are mounted on a supporting frame 37 of soft magnetic material arranged within a casing 38. Sets of circumferentially spaced apart threaded studs or elements 39 having roughened surfaces extend from the pole faces 36, and are secured thereto by the ends of the studs 39 which extend into the pole faces. Circumferentially spaced apart threaded studs or elements 40 having roughened surfaces extend from the supporting frame 37 in circumferentially and axially staggered relation with respect to the projecting studs 39, and are secured by threaded engagement in the frame 37. In constructing this permanent magnet excitation system, the pole faces 36 are arranged concentrically within the cylindrical frame 37, and radially spaced apart from the frame 37 in such a manner that the studs 39 are out of alignment with the studs 40, so that none of the studs extend in the same shearing plane as the next adjacent stud. In this arrangement, the ends of the studs 40 extending from the frame 37, and the ends of the studs 39 extending from the pole faces 36 into the permanent magnet pole pieces 35 each extend radially more than one-half of the thickness of the pole pieces 35. The permanent magnet pole pieces are then cast between the pole faces 36 and the supporting frame 37, and when the molten permanent magnet material cools, it tends to shrink and clamp or compressively bind about the roughened surfaces of the studs 39 and 40, and thereby securely fasten together the pole faces 36, the pole pieces 35, and the frame 37. Laminations 41 are secured in the soft magnetic material pole faces 36, and extend axially substantially the length of the armature core 30, and thereby substantially reduce eddy currents which may be generated in the pole faces 36 by the flux variations caused by the rotating armature core 30. Furthermore, it has been found that a cross-magnetizing flux resulting from the armature currents tends to produce poor voltage regulation, and in order to eliminate or substantially reduce the effect of this armature cross flux, slots 42 are formed, which extend axially through the laminations 41, the pole faces 36, and into the permanent magnet pole pieces 35. The arrangement of the laminations 41 in the pole faces 36, and of the slots 42 in the pole pieces does not form part of my invention, as claimed in this application, but is the joint invention of Mr. W. R. Goss and myself, and is described and claimed in our copending application, Serial No. 161,452, filed August 28, 1937, and assigned to the General Electric Company, assignee of this application.

In Figs. 5 and 6, I have shown a dynamo-electric machine provided with another embodiment of my invention and having a rotatable member of the same construction as that illustrated in Figs. 3 and 4. The dynamo-electric machine includes a stationary member arranged to cooperate electrodynamically with the rotatable member, and is provided with a pair of transversely arcuate thin bar-type permanent magnet pads or pole pieces 43, which are preferably formed of an alloy of aluminum, nickel, cobalt, and iron, such as that mentioned above. These pole pieces 43 are secured by welding at 44 to a supporting frame 45 of soft magnetic material arranged with a shell or frame 46. The permanent magnet pole pieces 43 are each provided with a pole face 47 of soft magnetic material having threaded steel studs or roughened projections 48 extending therefrom and secured thereto by welding, as shown at 49. In making this type of pole piece, the studs or elements 48 are welded to the pole faces 47, and the permanent magnet pole pieces are cast in contact with the outer face of the pole faces 47 and about the projections 48. In this manner, when the molten permanent magnet material cools and shrinks, it securely clamps the pole faces 47 to the pole pieces 43 by the clamping or compressive binding action of the permanent magnet material about the roughened surfaces of the studs 48. As shown in Figs. 5 and 6, the studs 48 are arranged in axially and circumferentially spaced apart relation, and thereby provide for good magnetic contact between the pole faces 47 and the pole pieces 43. As in Figs. 3 and 4, the pole faces are provided with laminations 41 in order to minimize the effect of eddy currents produced in the pole faces, and slots 42 are formed axially through the laminations 41, the pole faces 47, and the pole pieces 43 in order to minimize the effect of the armature cross flux.

In Fig. 7, I have shown a dynamo-electric machine which includes a rotatable member of the same construction as that shown in Figs. 3, 4, 5 and 6, and having an excitation system comprising a stationary member arranged to cooperate electrodynamically with the core 30 of the rotatable member. The stationary member includes a pair of transversely arcuate thin bar type permanent magnet pads or pole pieces 50 provided with pole faces 51 formed of a soft magnetic material. These pole faces 51 are secured to the pole pieces 50 by threaded elements 50 or roughened steel studs or projections 52, which extend from the pole faces 51 into the pole pieces 50, and are secured to the pole faces 51 by extensions 53 which project into the pole faces and are secured in position by being riveted against shoulders on the studs at 54 and to the outer side of the pole faces 51. Similar roughened studs 55 extend from a frame or core 56 of soft magnetic material and into the permanent magnet pole pieces 50. These studs are secured to the frame 56 by reduced extensions 57, which project into the frame 56 and are secured thereto by being riveted over at 58 in countersunk openings formed in the outer surface of the frame 56. The frame 56 is supported in a shell 46, as in the construction shown in Figs. 3, 4, 5, and 6. As in Figs. 3 and 4, laminations 41 are secured in the pole face 51 adjacent the rotatable member core 30 to minimize the effect of eddy currents produced in the pole face 51. In constructing this excitation system, the roughened or threaded studs 52 and 55 are first secured by riveting to the pole faces 51 and the frame 56, respectively. The pole faces 51 are then arranged in concentric relation radially spaced from and within the frame 56, so that the studs 52 and 55 extend radially towards each other in axially staggered relation and the adjacent ends of these projections each extend more than one-half the distance between the adjacent surfaces of the pole faces and the frame. The molten permanent magnet material is then cast between the pole faces 51 and the frame 56 and about the roughened studs 52 and 55. When the molten permanent magnet material cools and shrinks, it becomes securely clamped to the pole faces 51 and frame 56 by the clamping or compressive binding action of the pole pieces 50 about the roughened studs and produces a very good magnetic contact between the pole pieces 50, the pole faces 51, and the frame 56.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamo-electric machine having a core of magnetic material provided with a winding, a magnetic excitation system including a plurality of permanent magnet pole pieces arranged to cooperate electrodynamically with said core, a member of magnetic material arranged to support pole pieces, means including a plurality of elements extending into said supporting member and having roughened surfaces extending into said pole pieces for securing said pole pieces thereto, a pole face of magnetic material carried by each of said pole pieces, and means including another plurality of elements having roughened surfaces extending from said pole faces and into said pole pieces for securing said pole faces thereto, said other plurality of elements being arranged out of alignment with said first-mentioned plurality of elements.

2. A dynamo-electric machine having a core of magnetic material provided with a winding, a magnetic excitation system including a plurality of permanent magnet pole pieces arranged to cooperate electrodynamically with said core, a member of magnetic material arranged to support said pole pieces, means including a plurality of elements extending from said supporting member and having roughened surfaces extending into said pole pieces for securing said pole pieces thereto, a pole face of magnetic material carried by each of said pole pieces, and means including another plurality of elements having roughened surfaces extending from said pole faces and into said pole pieces for securing said pole faces thereto, said other plurality of securing elements being arranged in axially staggered and circumferentially staggered relation with respect to said first-mentioned plurality of securing elements.

3. A dynamo-electric machine having a core of magnetic material provided with a winding, a magnetic excitation system including a plurality of permanent magnet pole pieces arranged to cooperate electrodynamically with said core, a member of magnetic material arranged to support said pole pieces, means including a plurality of elements having roughened surfaces extending into said pole pieces and into said supporting member for securing said pole pieces thereto, a pole face of magnetic material carried by each of said pole pieces, and means including another plurality of elements having roughened surfaces extending from said pole faces and into said pole pieces for securing said pole faces thereto, said other plurality of elements being arranged in axially staggered relation with respect to said first-mentioned plurality of elements.

4. A dynamo-electric machine having a core of magnetic material provided with a winding, a magnetic excitation system including a plurality of permanent magnet pole pieces arranged to cooperate electrodynamically with said core, a member of magnetic material arranged to support said pole pieces, means including a plurality of threaded elements extending into said pole pieces and into said supporting member for securing said pole pieces thereto, a pole face of magnetic material carried by each of said pole pieces, and means including another plurality of threaded elements extending from said pole faces and into said pole pieces for securing said pole faces thereto, said other plurality of threaded elements being arranged at a different angle with respect to the next adjacent threaded element of said first-mentioned plurality of threaded elements.

5. A dynamo-electric machine having a stationary member provided with a core of magnetic material, a winding arranged on said core, a rotatable member having a plurality of arcuate permanent magnet pole pieces of substantially uniform thickness, a member of magnetic material and substantially elliptical transverse cross-section arranged to support said pole pieces, and means including a plurality of elements having roughened surfaces extending from said supporting member and into said pole pieces for securing said pole pieces thereto.

6. A dynamo-electric machine having a stationary member provided with a core of magnetic material, a winding arranged on said core, a rotatable member having a plurality of arcuate permanent magnet pole pieces of substantially uniform thickness arranged to cooperate electrodynamically with said stationary member, a member of magnetic material and substantially elliptical transverse cross-section arranged to support said pole pieces, means including a plurality of elements having roughened surfaces extending from said supporting member and into said pole pieces for securing said pole pieces thereto, and a pole face of magnetic material carried by each of said pole pieces.

7. A dynamo-electric machine having a stationary member provided with a core of magnetic material, a winding arranged on said core, a rotatable member having a plurality of arcuate permanent magnet pole pieces of substantially uniform thickness, a member of magnetic material arranged to support said pole pieces, said supporting member having longitudinally extending transversely arcuate sides formed on a radius substantially equal to the radius of the outer arcuate sides of said permanent magnet pole pieces, a pole face of magnetic material carried by each of said pole pieces, and means including a non-magnetic element extending between adjacent edges of adjacent pole faces and secured thereto for securing together said pole faces.

8. A dynamo-electric machine having a stationary member provided with a core of magnetic material, a winding arranged on said core, a rotatable member having a plurality of arcuate permanent magnet pole pieces of substantially uniform thickness, a member of magnetic material arranged to support said pole pieces, said supporting member having a transverse width substantially equal to that of said permanent magnet pole pieces, a pole face of magnetic material carried by each of said pole pieces, a non-magnetic element extending between and secured to adjacent longitudinally extending edges of adjacent pole faces, and non-magnetic plates arranged at each end of said rotatable member and secured to adjacent transverse ends of said pole faces.

9. A dynamo-electric machine having a stationary member provided with a core of magnetic material, a winding arranged on said core, a rotatable member having a plurality of arcuate permanent magnet pole pieces, a member of magnetic material arranged to support said pole pieces, said supporting member having an axial length substantially equal to the axial length of said permanent magnet pole pieces and a transverse width substantially equal to that of said permanent magnet pole pieces, a plate of low electrical resistance material arranged at each end of said rotatable member, and a bar of low electrical resistance material arranged between each pair of adjacent pole pieces and secured in good electrical contact to each of said plates.

10. A dynamo-electric machine having a stationary member provided with a core of magnetic material, a winding arranged on said core, a rotatable member having a plurality of arcuate permanent magnet pole pieces, a member of magnetic material arranged to support said pole pieces, said supporting member having longitudinally extending transversely arcuate sides formed on a radius substantially equal to the radius of the outer arcuate sides of said permanent magnet pole pieces, a pole face of magnetic material carried by each of said pole pieces, means including a non-magnetic element extending between adjacent longitudinally extending edges of adjacent pole faces and secured thereto for securing together said pole faces, a plate of low electrical resistance material arranged at each end of said rotatable member, a bar of low electrical resistance material arranged between each pair of adjacent pole pieces and between said non-magnetic element and said pole pieces, and means for securing said bars in good electrical contact to each of said plates.

11. A dynamo-electric machine having a stationary member provided with a core of magnetic material, a winding arranged on said core, a rotatable member having a plurality of arcuate permanent magnet pole pieces of substantially uniform thickness, and a member of magnetic material and substantially elliptical transverse cross-section arranged to support said pole pieces.

12. A dynamo-electric machine having a stationary member provided with a core of magnetic material, a winding arranged on said core, a rotatable member having a plurality of arcuate permanent magnet pole pieces, a member of magnetic material arranged to support said pole pieces, said supporting member having an axial length substantially equal to the axial length of said permanent magnet pole pieces and a transverse width substantially equal to that of said permanent magnet pole pieces, and a pole face of magnetic material carried by each of said pole pieces.

13. A dynamo-electric machine having a stationary member provided with a core of magnetic material, a winding arranged on said core, a rotatable member having a plurality of arcuate permanent magnet pole pieces, a member of magnetic material arranged to support said pole pieces, said supporting member having longitudinally extending transversely arcuate sides formed on a radius substantially equal to the radius of the outer arcuate side of said permanent magnet pole piece, and a pole face of magnetic material carried by each of said pole pieces.

14. A dynamo-electric machine having a stationary member provided with a core of magnetic material, a winding arranged on said core, a rotatable member having a plurality of arcuate permanent magnet pole pieces of substantially uniform thickness, the outer arcuate sides of said permanent magnet pole pieces being arranged to form sections of a single substantially cylindrical surface, a member of magnetic material arranged to support said pole pieces, said supporting member having a substantially non-circular transverse cross section and longitudinally extending transversely arcuate sides formed on a radius substantially equal to the radius of the outer arcuate sides of said permanent magnet pole pieces, and a pole face of magnetic material carried by each of said pole pieces.

FRANK W. MERRILL.